US012753881B2

(12) United States Patent
Wee et al.

(10) Patent No.: US 12,753,881 B2
(45) Date of Patent: Oct. 6, 2026

(54) HIGH-PRESSURE FLUID STORAGE CONTAINER WITH OXIDATION RESISTANCE/HYDROGEN EMBRITTLEMENT RESISTANCE THROUGH SURFACE TREATMENT

(71) Applicant: DUKSAN AETHERCT CO., LTD., Busan (KR)

(72) Inventors: Ho-Sun Wee, Busan (KR); Seok-Bong Heo, Busan (KR); Hyeon Joon Jeong, Busan (KR); Seong Hyeon Yoon, Busan (KR)

(73) Assignee: DUKSAN AETHERCT CO., LTD., Busan (KR)

( * ) Notice: Subject to any disclaimer, the term of this patent is extended or adjusted under 35 U.S.C. 154(b) by 173 days.

(21) Appl. No.: 18/633,682

(22) Filed: Apr. 12, 2024

(65) Prior Publication Data

US 2025/0216029 A1 Jul. 3, 2025

(30) Foreign Application Priority Data

Dec. 29, 2023 (KR) ........................ 10-2023-0196156

(51) Int. Cl.
*F17C 1/10* (2006.01)
*F17C 13/06* (2006.01)

(52) U.S. Cl.
CPC ................ *F17C 1/10* (2013.01); *F17C 13/06* (2013.01); *F17C 2203/0604* (2013.01); *F17C 2203/0639* (2013.01); *F17C 2209/23* (2013.01); *F17C 2223/035* (2013.01)

(58) Field of Classification Search
CPC .... F17C 1/10; F17C 13/06; F17C 2203/0604; F17C 2203/0639; F17C 2209/23; F17C 2223/035; F17C 2205/0311; F17C 2209/234; F17C 2221/012; F17C 2260/036; F17C 1/14; Y02E 60/32
USPC .......................................................... 220/581
See application file for complete search history.

(56) References Cited

U.S. PATENT DOCUMENTS

| | | | | | |
|---|---|---|---|---|---|
| 5,850,934 | A * | 12/1998 | Kumar | F17C 13/06 220/240 |
| 6,089,399 | A | 7/2000 | Felbaum et al. | |
| 2003/0189053 | A1 * | 10/2003 | Felbaum | F17C 13/06 220/582 |
| 2006/0191600 | A1 * | 8/2006 | Omura | C22C 38/04 148/287 |

FOREIGN PATENT DOCUMENTS

| | | | |
|---|---|---|---|
| CN | 101187441 | A | 4/2010 |
| DE | 102020107562 | A1 | 9/2021 |
| JP | 4514033 | B2 * | 7/2010 |
| KR | 10-2015-0137895 | A | 6/2021 |
| KR | 102550782 | B1 | 7/2023 |

* cited by examiner

*Primary Examiner* — Laura E. Parker
(74) *Attorney, Agent, or Firm* — NKL LAW; Jae Youn Kim

(57) ABSTRACT

Provided herein is a high-pressure fluid storage container with oxidation resistance/hydrogen embrittlement resistance through surface treatment.

7 Claims, 9 Drawing Sheets

HIGH-PRESSURE FLUID STORAGE CONTAINER WITH OXIDATION RESISTANCE/HYDROGEN EMBRITTLEMENT RESISTANCE THROUGH SURFACE TREATMENT

BACKGROUND OF THE INVENTION

Field of the Invention

The present invention relates to a high-pressure fluid storage container, and more specifically, to a high-pressure fluid storage container with oxidation resistance/hydrogen embrittlement resistance through surface treatment.

Background Art

Conventionally, fossil fuels, which have been used as the main energy source, are increasingly facing concerns regarding depletion over time, and due to environmental pollution issues, human attention is gradually shifting towards other alternative energy sources.

Among such alternative energy sources, hydrogen fuel is drawing attention. Hydrogen is not only abundant but also has very high potential as it does not cause concern over environmental pollution.

Specifically, hydrogen fuel cell vehicles are being studied as an alternative to replace existing internal combustion engine vehicles, and achievements are currently being made in this field.

Accordingly, various studies are actively being conducted on storage containers that can safely store high-pressure hydrogen gas filled at vehicles, charging stations, etc.

Hydrogen storage containers are generally manufactured by preparing a pipe with an internal cavity formed therein, rotating it through a spinning process, and pressurizing it to form an overall shape.

However, since such hydrogen storage containers are continuously exposed to a high-pressure hydrogen gas environment, there is a problem of hydrogen embrittlement phenomenon occurring where hydrogen penetrates the steel material constituting the container, decreasing its physical properties.

This not only significantly reduces the airtightness of the hydrogen storage container but also shortens its lifespan.

Therefore, a method to solve such problems is required.

PATENT LITERATURE

Patent Documents

Patent Document 1: Korean Patent Publication No. 10-2015-0137895

SUMMARY OF THE INVENTION

Accordingly, the present invention has been made to solve the above-mentioned problems occurring in the prior arts, and it is an objective of the present invention to provide a high-pressure fluid storage container, which is surface-treated to have oxidation resistance/hydrogen embrittlement resistance, thereby enhancing sealability and enabling long-term use.

The objectives of the present disclosure are not limited to those mentioned above, and other objectives not mentioned herein will be clearly understood by those skilled in the art from the following description.

To accomplish the above object, according to the present invention, there is provided a high-pressure fluid storage container with oxidation resistance/hydrogen embrittlement resistance through surface treatment including: a container body, which has a storage space for storing high-pressure fluid inside, and a plug coupling portion formed at least on one of both end portions thereof; and an end plug which is coupled to the plug coupling portion, and has a fluid passage hole formed internally to allow flow of fluid therethrough, wherein a surface-treated embrittlement-resistant layer is formed in an area where at least the plug coupling portion and the end plug come into contact with each other, to prevent oxidation and hydrogen embrittlement.

In this instance, the embrittlement-resistant layer is formed on both of the plug coupling portion and the end plug.

Moreover, the container body and the end plug are formed of chromium (Cr)-containing steel.

Furthermore, the embrittlement-resistant layer is formed by the following steps: (a) inserting the plug coupling portion and the end plug into a chamber; (b) injecting air into the chamber and primarily heating the plug coupling portion and the end plug under atmospheric conditions; (c) discharging air from the chamber; and (d) injecting hydrogen into the chamber and secondarily heating the plug coupling portion and the end plug under a hydrogen atmosphere.

In this instance, step (b) heats the plug coupling portion and the end plug to temperature between 600° C. and 900° C. under atmospheric conditions.

Additionally, step (d) controls the water vapor pressure in the hydrogen atmosphere to $10^{-8}$ to $10^{-1}$ MPa and heats to temperature of 1,000° C. to 1,200° C.

Meanwhile, the high-pressure fluid storage container further includes a sealing unit which is installed in a ring-shaped sealing groove formed between an end surface of the container body and a facing surface of the end plug getting in contact with the end surface of the container body, to seal the inside of the storage space.

In addition, the sealing unit includes: a sealing jacket formed of an elastic material to be fittable into the sealing groove, having an insertion space with one side open formed inside, and a compression spring formed of a metal material, inserted into the insertion space, and providing an elastic compression force on both sides with the open portion of the insertion space as the center, thereby causing the sealing jacket to adhere to the end face of the container body and the opposing face of the end plug.

As described above, the high-pressure fluid storage container with oxidation resistance/hydrogen embrittlement resistance through surface treatment according to the present invention has the advantage of improving airtightness by preventing the material from being oxidized or hydrogen molecules from penetrating into the material, as the embrittlement-resistant layer is surface-treated in at least the area where the plug coupling portion of the container body and the end plug come into contact.

Additionally, the high-pressure fluid storage container according to the present invention can prevent material oxidation or hydrogen embrittlement, thus enabling long-term use.

The advantages of the present disclosure are not limited to the above-mentioned advantages, and other advantages, which are not specifically mentioned herein, will be clearly understood by those skilled in the art from the following description.

DETAILED DESCRIPTION OF THE PREFERRED EMBODIMENT

Figure 1:
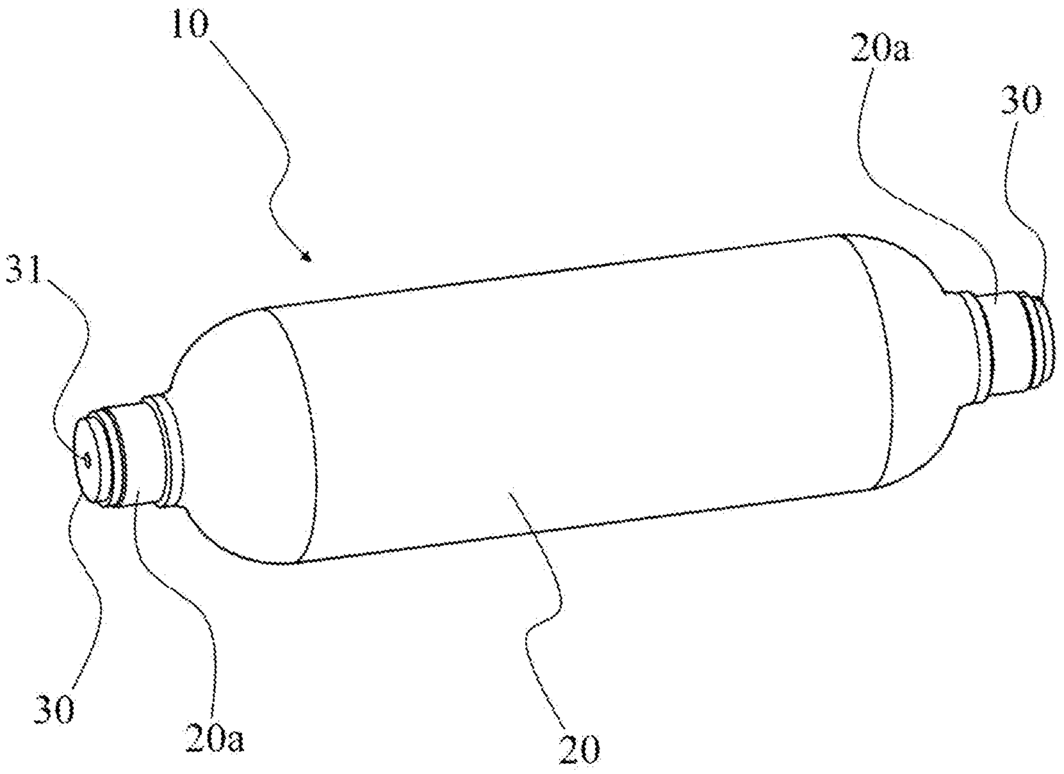
FIG. 1 is a diagram illustrating the appearance of a high-pressure fluid storage container with oxidation resistance/hydrogen embrittlement resistance achieved through surface treatment according to a first embodiment of the present invention.

In this specification, when it is mentioned that any component (or area, layer, part, etc.) is "on," "connected to," or "coupled to" another component, it means that any component can be directly positioned/connected/coupled on another component or a third component may be positioned between them.

The same reference numerals denote the same components. Additionally, in the drawings, the thickness, proportions, and dimensions of the components are exaggerated for effective description of the technical content.

The term "and/or" includes any and all combinations of the associated components that may be defined.

Terms such as "first," "second," etc., may be used to describe various components, but the components mentioned above should not be limited by the terms. The terms are used only to distinguish one component from another. For example, without departing from the scope of the present invention, the first component may be named the second component, and similarly, the second component may also be named the first component. The singular form includes the plural form unless explicitly different in context.

Furthermore, terms such as "below," "lower side," "above," "upper side," etc., are used to describe the relationships of components illustrated in the drawings. The terms are relative concepts and are described based on the direction indicated in the drawings.

Unless otherwise defined, all terms (including technical and scientific terms) used in this specification have the same meaning as understood by those skilled in the art to which the invention belongs. In addition, terms such as those defined in general dictionaries should be interpreted to have meanings consistent with the meanings in the relevant context of the technology, and should be interpreted as having meanings consistent with the meanings in the ideal or overly formal sense, unless explicitly defined here.

The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Hereinafter, embodiments of the present invention will be described in detail with reference to the drawings.

FIG. 1 is a diagram illustrating the appearance of a high-pressure fluid storage container 10 with oxidation resistance/hydrogen embrittlement resistance achieved through surface treatment according to a first embodiment of the present invention.

As illustrated in FIG. 1, the high-pressure fluid storage container 10 according to the first embodiment of the present invention includes a container body 20 and an end plug 30.

The container body 20 has a storage space for storing high-pressure fluid inside, and may have various lengths and shapes depending on applicable places and usage.

Moreover, the high-pressure fluid filled in the storage space is hydrogen, but the high-pressure fluid applicable to the high-pressure fluid storage container 10 according to the present invention is not limited to hydrogen.

The end plug 30 can be coupled to at least one of both end portions of the container body 20.

That is, the end plug 30 may be provided only on one end portion of the container body 20 depending on the shape of the container body 20, or may be provided on both end portions of the container body 20.

For this purpose, a plug coupling portion **20*a* for coupling with the end plug 30 may be formed on any one of both end portions of the container body 20**.

Furthermore, a fluid passage hole 31 through which fluid flows can be formed on the inner side of the end plug 30. The fluid passage hole 31 forms a gas flow path when the end plug is docked with filling equipment or gas extraction equipment outside the high-pressure fluid storage container 10.

Meanwhile, in the present embodiment, the container body 20 and the end plug 30 may be formed of chromium (Cr)-containing steel, but the material of the container body 20 and the end plug 30 is not limited thereto.

Figure 2:
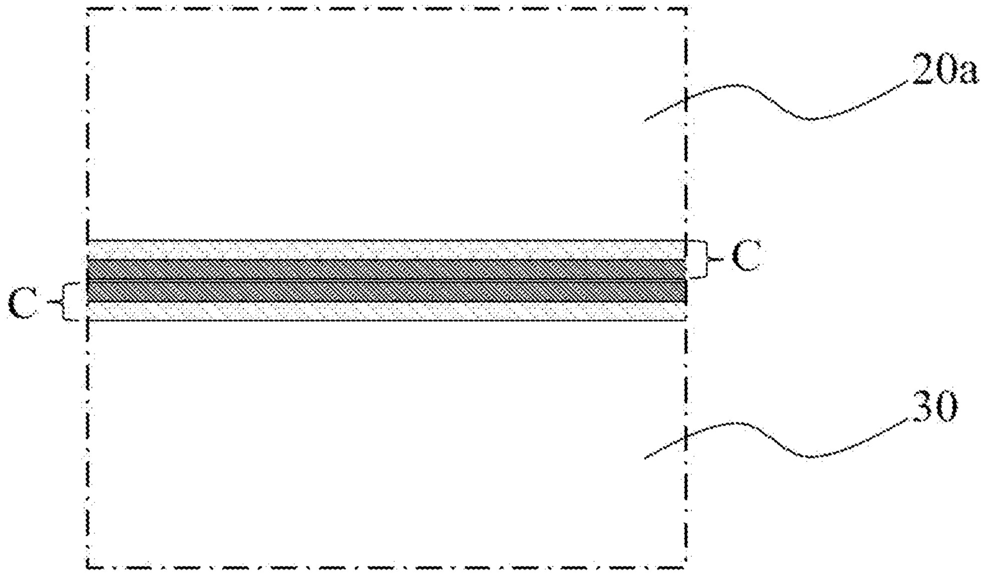
FIG. 2 is a sectional view of an end portion of the high-pressure fluid storage container with oxidation resistance/hydrogen embrittlement resistance achieved through surface treatment according to the first embodiment of the present invention.

FIG. 2 is a sectional view of an end portion of the high-pressure fluid storage container 10 with oxidation resistance/hydrogen embrittlement resistance achieved through surface treatment according to the first embodiment of the present invention.

As illustrated in FIG. 2, the high-pressure fluid storage container 10 of the present embodiment may have a surface-treated embrittlement-resistant layer C formed at least in the area where the plug coupling portion **20*a* and the end plug 30** come into contact with each other to prevent oxidation and hydrogen embrittlement.

Such an embrittlement-resistant layer C serves to prevent oxidation of the material constituting the container body 20 and the end plug 30 or the penetration of hydrogen molecules into the material.

Accordingly, the embrittlement-resistant layer C enhances sealability of the high-pressure fluid storage container 10 of the present embodiment and enables long-term use.

Furthermore, the embrittlement-resistant layer C may be formed only on one of the plug coupling portion 20*a* and the end plug 30 of the container body 20, or may be formed on both a plug coupling portion 20*a* and the end plug 30 of the container body 20.

In the present embodiment, the embrittlement-resistant layer C is illustrated to be formed on both sides of the plug coupling portion 20*a* and the end plug 30.

Meanwhile, a method of forming such an embrittlement-resistant layer C is as follows.

Figure 3:
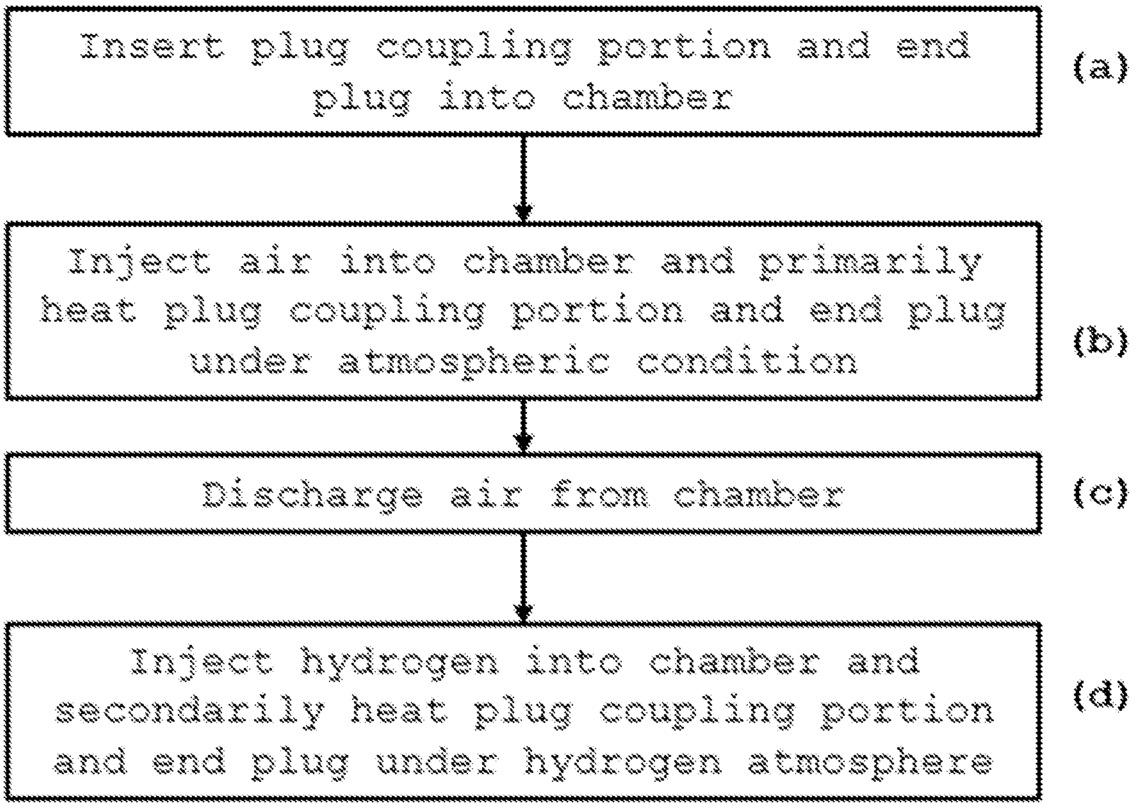
FIG. 3 is a diagram illustrating the entire process of forming an embrittlement-resistant layer in the high-pressure fluid storage container with oxidation resistance/hydrogen embrittlement resistance achieved through surface treatment according to the first embodiment of the present invention.

FIG. 3 is a diagram illustrating the entire process of forming an embrittlement-resistant layer C in the high-pressure fluid storage container 10 with oxidation resistance/hydrogen embrittlement resistance achieved through surface treatment according to the first embodiment of the present invention.

As illustrated in FIG. 3, the process of forming the embrittlement-resistant layer C may include steps (a) through (d).

Step (a) involves inserting the plug coupling portion 20*a* of the container body 20 and the end plug 30 into a chamber.

When the entire container body 20 is surface-treated, the entire container body 20 may be inserted into the chamber. However, when only the plug coupling portion 20*a* of the container body 20 is surface treated, the plug coupling portion 20*a* may be exposed in the chamber to prevent the treatment gas supplied in the subsequent step from diffusing to other parts of the container body 20.

Step (b) involves injecting air into the chamber, and primarily heating the plug coupling portion 20*a* and the end plug 30 under atmospheric conditions.

In the present embodiment, step (b) may involve heating the plug coupling portion 20*a* and the end plug 30 under atmospheric conditions to temperature of 600° C. to 900° C. to form an oxide film.

This is because heating below 600° C. may result in an oxide film formed on the surface of the plug coupling portion 20*a* and the end plug 30 with insufficient thickness.

In addition, heating above 900° C. may excessively generate the oxide film in this process, so it is difficult to form the embrittlement-resistant layer in the subsequent step (d).

Next, step (c) involves discharging the air from the chamber.

The above step is for the subsequent step (d), which completely discharging the air contained inside the chamber to the outside.

Step (d) involves injecting hydrogen into the chamber, and secondarily heating the plug coupling portion 20*a* and the end plug 30 in a hydrogen atmosphere.

In the present embodiment, step (d) may be performed by controlling the water vapor pressure in the hydrogen atmosphere to $10^{-8}$ to $10^{-1}$ MPa and heating the plug coupling portion 20*a* and the end plug 30 to temperature of 1,000° C. to 1,200° C. to form an embrittlement-resistant layer.

This is because heating below 1000° C. may result in an embrittlement-resistant layer formed on the surface of the plug coupling portion 20*a* and the end plug 30 with insufficient thickness.

Additionally, heating above 1200° C. may excessively thicken the embrittlement-resistant layer in this process, so the adhesion of the entire embrittlement-resistant layer C may be deteriorated.

As described above, according to the present invention, the high-pressure fluid storage container 10 can prevent the material from being oxidized or hydrogen molecules from penetrating into the material, thereby improving airtightness and enabling long-term use, since the anti-embrittlement treatment layer C is surface-treated in at least the area where the plug coupling portion 20*a* of the body 20 and the end plug 30 come into contact with each other.

Meanwhile, the high-pressure fluid storage container 10 of the present embodiment may further include a sealing unit installed in a ring-shaped sealing groove formed between an end surface of the container body 20 and a facing surface of the end plug 30 getting in contact with the end surface of the container body 20 to seal the interior of the storage space.

Figure 4:
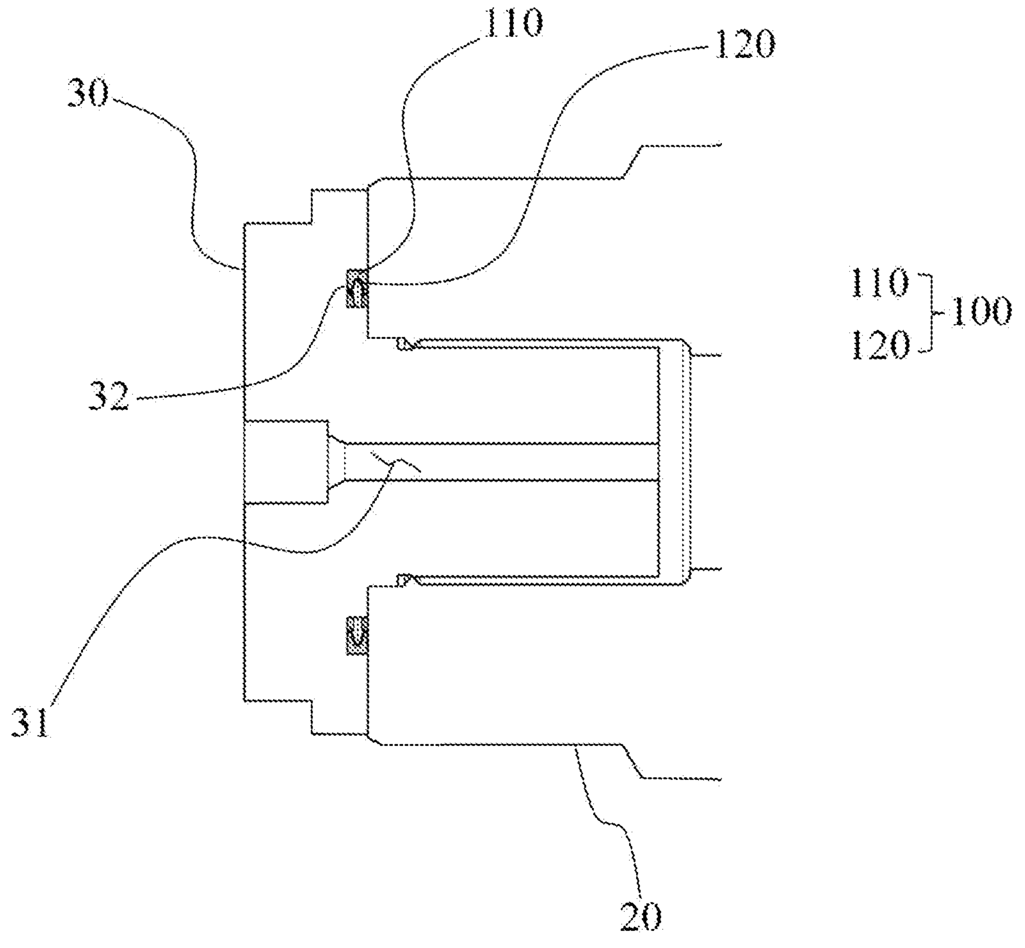
FIG. 4 is a diagram illustrating a sealing unit provided between a container body and an end plug in the high-pressure fluid storage container according to the first embodiment of the present invention.

FIG. 4 is a diagram illustrating a sealing unit 100 provided between the container body 20 and the end plug 30 in the high-pressure fluid storage container according to the first embodiment of the present invention.

As illustrated in FIG. 4, the sealing unit 100 for sealing the storage space is provided between the container body 20 and the end plug 30.

The sealing unit 100 plays a role in sealing the inside of the storage space by being installed in the ring-shaped sealing groove 32 formed between the end surface of the body 20 and the opposing surface of the end plug 30 contacting the end surface of the body 20.

Furthermore, the sealing unit 100 may include, in detail, a sealing jacket 110 and a pressure spring 120. Details of each component will be described later.

Additionally, in the present embodiment, the sealing groove 32 is recessed towards the end plug 30, but it should be understood that the above is just an example, and the sealing groove 32 may be recessed towards the container body 20 or may be recessed towards both the end plug 30 and the container body 20.

Figure 5:
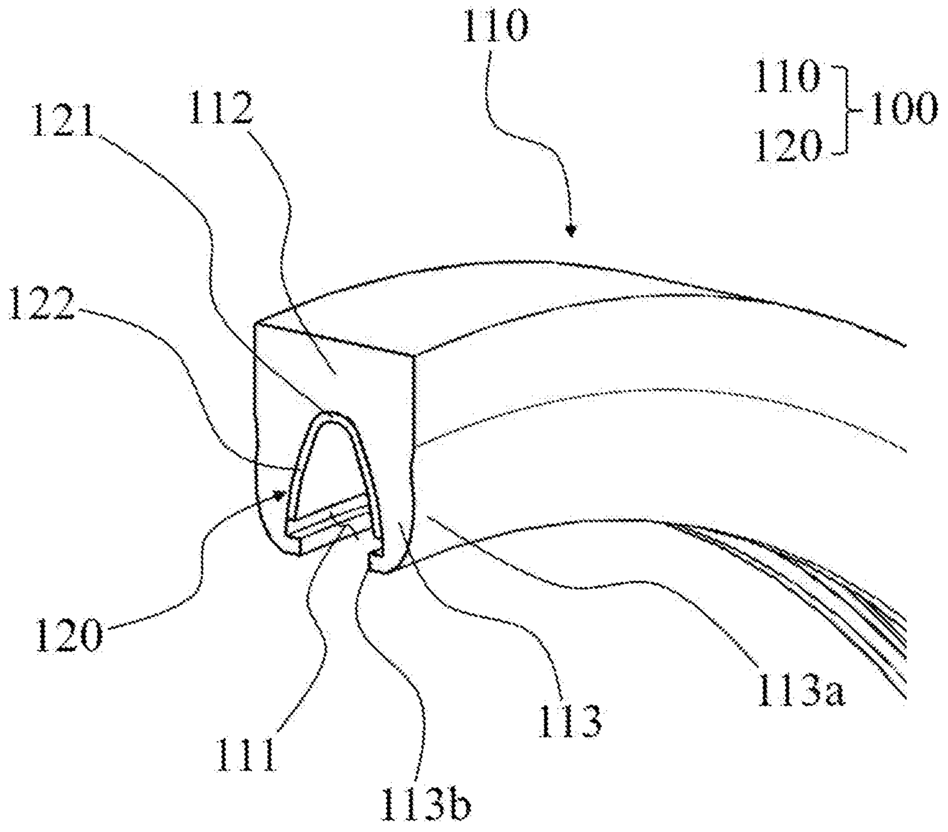
FIG. 5 is a diagram illustrating the structure of the sealing unit applied to the high-pressure fluid storage container according to the first embodiment of the present invention.

FIG. 5 is a diagram illustrating the structure of the sealing unit 100 applied to the high-pressure fluid storage container 10 according to the first embodiment of the present invention.

As illustrated in FIG. 5, the sealing jacket 110 is formed of an elastic material so as to be fittable to the sealing groove 32, and has an insertion space 111 formed inside to be open on one side.

In this case, the sealing jacket 110 may be arranged within the sealing groove 32 such that the opening of the insertion space 111 faces the storage space direction on a leakage path of the high-pressure fluid.

Additionally, in the present embodiment, the sealing jacket 110 may include a pair of a tight sealing portions 113 and a connection portion 112.

A pair of the tight sealing portions 113 are provided to respectively contact the end surface of the container body 20 or the facing surface of the end plug 30.

Moreover, the connection portion 112 connects one side of the pair of tight sealing portions 113 to each other, thus forming the insertion space 111 together with the pair of tight sealing portions 113.

That is, the sealing jacket 110 has the insertion space 111 formed inside, and the insertion space 111 has an opening formed in an open portion formed in some area.

More specifically, in the present embodiment, a lip 113*a* protruding outward in a curved shape may be formed on the outer surface of the connection portion 112.

The lip 113*a* can elastically deform and improve airtightness when in contact with the end surface of the body 20 or the opposing surface of the end plug 30.

Furthermore, in the present embodiment, a protrusion 113*b* extending toward the other connecting portion 112 on the opposite side and partially covering the open end of the insertion space 111 may be formed on the connecting portion 112.

The separation prevention protrusion 113*b* can prevent separation of a pressure spring 120 inserted into the insertion space 111 through the opening.

The pressure spring 120 is formed of a metallic material and is inserted into the insertion space 111, thereby providing elastic pressure on both sides based on the insertion space 111. Thus, the pressure spring 120 can serve to press the sealing jacket 110 to the end surface of the container body 20 and the facing surface of the end plug 30.

Moreover, in the present embodiment, the pressure spring 120 may include an elasticity providing portion 121 and a pair of pressure portions 122.

Among the elasticity providing portion 121 and the pair of pressure portions 122, the elastic providing portion 121 is formed in a curved shape to generate elastic force.

Furthermore, the pressure portions 122 extend from both sides of the elastic providing portion 121 to a predetermined length, respectively, and in a state in which the pressure portions 122 are inserted into the insertion space 111, serve to press the tight sealing portions 113 to the end surface of the container body 20 or the facing surface of the end plug 30.

That is, in the present embodiment, the pressure spring 120 is curved at a predetermined point to generate elastic force, and has a cross-section of an open-curved line shape.

Accordingly, the present invention can provide superior sealing force compared to conventional sealing means such as O-rings.

Hereinafter, descriptions will be given for other embodiments of the present invention. In each embodiment to be described below, redundant descriptions regarding components provided similarly to those in the first embodiment are omitted. Additionally, the same reference numerals as in the first embodiment will be assigned to components not appearing on the drawings in subsequent embodiments.

Figure 6:
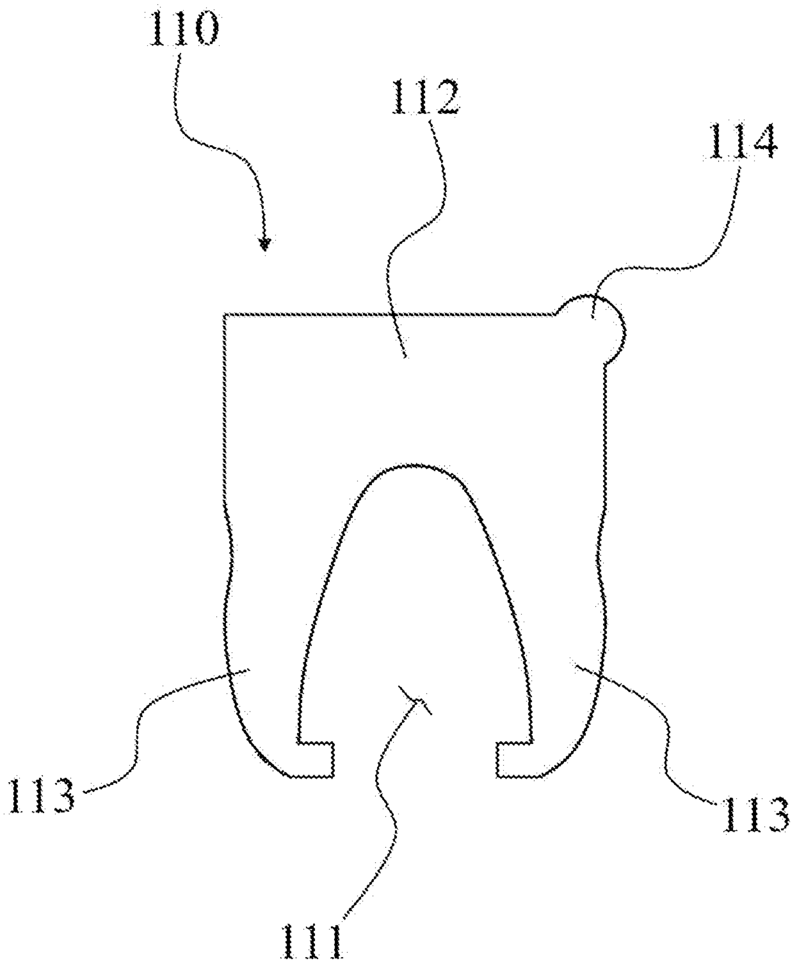
FIG. 6 is a diagram illustrating the appearance of a sealing jacket in a high-pressure fluid storage container according to a second embodiment of the present invention.

FIG. 6 is a diagram illustrating the appearance of a sealing jacket 110 in a high-pressure fluid storage container 10 according to a second embodiment of the present invention.

In the second embodiment of the present invention illustrated in FIG. 6, the sealing jacket 110 is formed to have an overall shape that is almost identical to that of the first embodiment including the connection portion 112 and the tight sealing portions 113.

However, the sealing jacket 110 in the present embodiment additionally includes a gap sealing portion 114 formed on one side of the connection portion 112.

The gap sealing portion 114 is formed in an expanded volume shape on one side of the connection portion 112 so as to fill a gap G (refer to FIG. 8) formed at the connection point between the container body 20 and the end plug 30, thereby preventing leakage of high-pressure fluid through the gap G.

In the present embodiment, the gap sealing portion (114) is exemplified as having a cross-section of an arc shape, but the shape of the gap sealing portion (114) can be variously modified without limitation.

Figure 7:
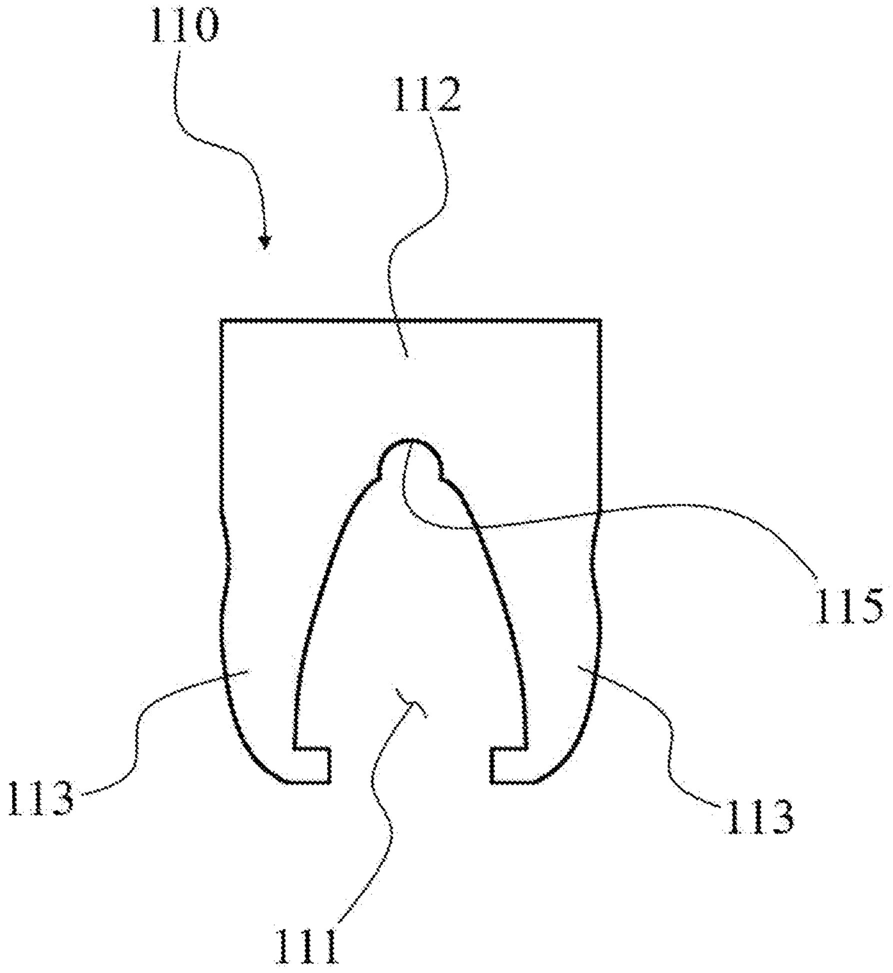
FIG. 7 is a diagram illustrating the appearance of a sealing jacket in a high-pressure fluid storage container according to a third embodiment of the present invention.

FIG. 7 is a diagram showing the sealing jacket 110 of the high-pressure fluid storage container 10 according to the third embodiment of the present invention.

In the third embodiment of the present invention illustrated in FIG. 7, the sealing jacket 110 is formed to have an overall shape that is almost identical to that of the first embodiment including the connection portion 112 and the tight sealing portions 113.

However, the sealing jacket 110 in the present embodiment additionally includes an auxiliary groove 115 that is recessed from the inner side of the insertion space 111 toward the connection portion 112.

The auxiliary groove 115 allows the pair of tight sealing portions 113 to more easily spread out when elastically deformed outward by the pressure spring 120.

In addition, in the present embodiment, the inner surface of the auxiliary recessed groove 115 is formed as a curved surface overall to prevent easy fracture, but the shape of the auxiliary recessed groove 115 can also be variously modified.

Figure 8:
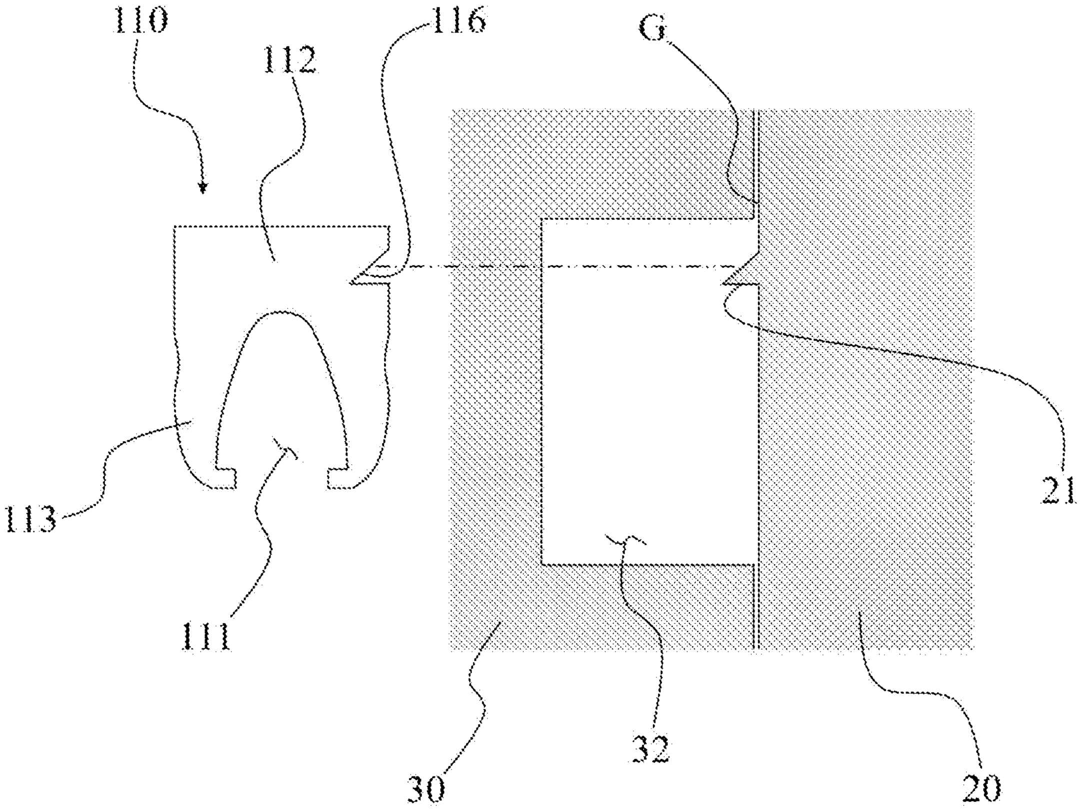
FIG. 8 is a diagram illustrating the inner side of a sealing groove and a sealing jacket in a high-pressure fluid storage container according to a fourth embodiment of the present invention.

FIG. 8 is a diagram illustrating the inner side of a sealing groove 32 and a sealing jacket 110 in a high-pressure fluid storage container 10 according to a fourth embodiment of the present invention.

In the fourth embodiment of the present invention illustrated in FIG. 8, the sealing jacket 110 is formed to have an overall shape that is almost identical to that of the first embodiment including the connection portion 112 and the tight sealing portions 113.

However, in the present embodiment, a fluid barrier protrusion 21 protruding toward the internal space of the sealing groove 32 to a predetermined length is formed on the container body 20.

Moreover, in the present embodiment, the sealing jacket 110 has a protrusion insertion groove 116 recessed in a shape corresponding to the fluid barrier protrusion 21 so that the fluid barrier protrusion 21 can be inserted when the sealing jacket 110 is inserted into the sealing groove 32.

Accordingly, in the present embodiment, when the sealing jacket 110 is inserted into the sealing groove 32, the fluid barrier protrusion 21 is inserted into the protrusion insertion groove 116 of the sealing jacket 110, physically blocking the high-pressure fluid from flowing into the gap G between the body 20 and the end plug 30 from the inside of the storage space of the high-pressure fluid storage container 10.

Figure 9:
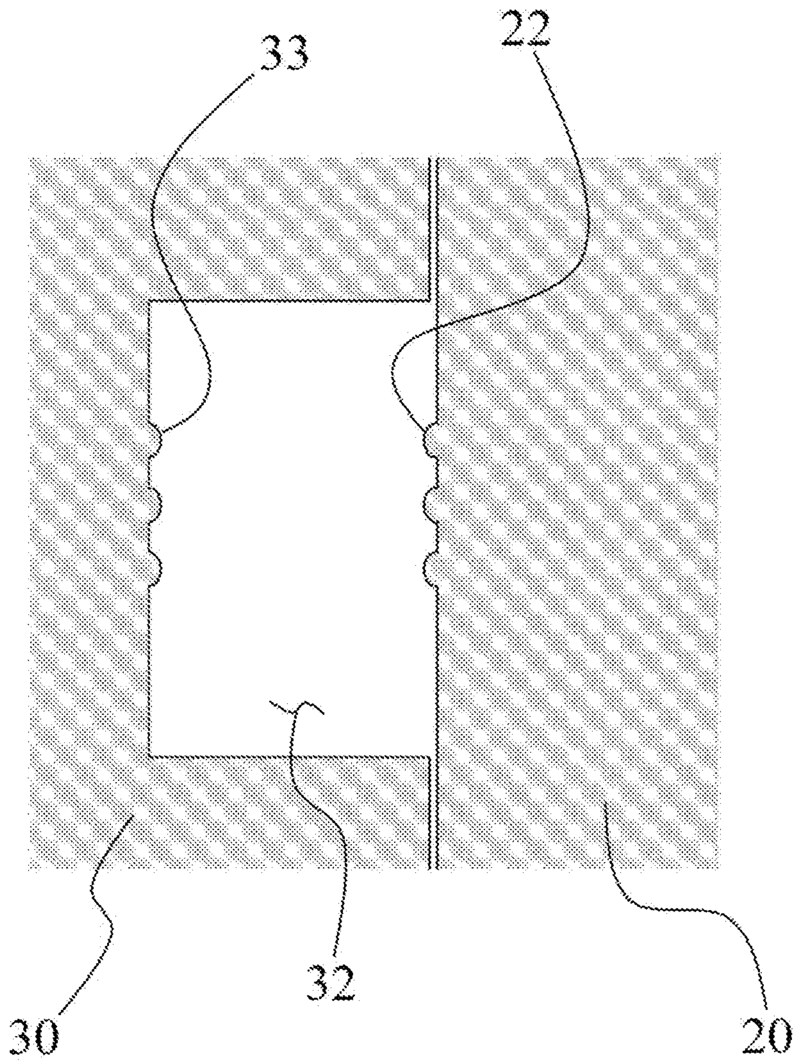
FIG. 9 is a diagram illustrating the inner side of a sealing groove in a high-pressure fluid storage container according to a fifth embodiment of the present invention.

FIG. 9 is a diagram illustrating the inner side of a sealing groove 32 in a high-pressure fluid storage container 10 according to a fifth embodiment of the present invention.

In the fifth embodiment of the present invention illustrated in FIG. 9, a plurality of adhesive protrusions 22 and 33 protruding toward the internal space of the sealing groove 32 are sequentially arranged on the end surface of the container body 20 and the facing surface of the end plug 30, respectively.

The adhesive protrusions 22 and 33 strongly press the outer surface of the tight sealing portion 113 in the state in which the sealing jacket 110 is inserted into the sealing groove 32, thereby maximizing the sealing effect.

As described above, while desirable embodiments of the present invention have been examined, it is understood by those skilled in the art that the present invention can be embodied in various specific forms without departing from the spirit or scope of the present invention. Therefore, the described embodiments should be considered as illustrative, not restrictive, and accordingly, the present invention can be modified within the scope of the appended claims and the equivalents.

What is claimed is:

1. A high-pressure fluid storage container, comprising:

a container body, which has a storage space for storing high-pressure fluid inside, and a plug coupling portion formed at least on one of both end portions thereof;

an end plug which is coupled to the plug coupling portion, and has a fluid passage hole formed internally to allow flow of fluid therethrough; and a sealing unit which is installed in a ring-shaped sealing groove formed between an end surface of the container body and a facing surface of the end plug getting in contact with the end surface of the container body, to seal the interior of the storage space, wherein the sealing unit comprises:

a sealing jacket made of an elastic material fitting into the sealing groove, having an insertion space formed therein with one side being open; and a compression spring made of a metal material, inserted into the insertion space, and providing an elastic compression force on both sides of the open portion of the insertion space to bring the sealing jacket into contact with the end surface of the container body and the facing surface of the end plug, wherein the sealing jacket further comprises a separation prevention protrusion configured to partially cover an opening of the insertion space so as to prevent the compression spring from being separated through the opening, and wherein a surface-treated embrittlement-resistant layer is formed in an area where at least the plug coupling portion and the end plug come into contact with each other, to prevent oxidation and hydrogen embrittlement.

2. The high-pressure fluid storage container according to claim 1, wherein the embrittlement-resistant layer is formed on both of the plug coupling portion and the end plug.

3. The high-pressure fluid storage container according to claim 2, wherein the container body and the end plug are formed of chromium (Cr)-containing steel.

4. The high-pressure fluid storage container according to claim 3, wherein the embrittlement-resistant layer is formed by the following steps:

(a) inserting the plug coupling portion and the end plug into a chamber;

(b) injecting air into the chamber and primarily heating the plug coupling portion and the end plug under atmospheric conditions;

(c) discharging air from the chamber; and (d) injecting hydrogen into the chamber and secondarily heating the plug coupling portion and the end plug under a hydrogen atmosphere.

5. The high-pressure fluid storage container according to claim 4, wherein step (b) heats the plug coupling portion and the end plug to temperature between 600° C. and 900° C. under atmospheric conditions.

6. The high-pressure fluid storage container according to claim 4, wherein step (d) controls the water vapor pressure in the hydrogen atmosphere to $10^{-8}$ to $10^{-1}$ MPa and heats to temperature of 1,000° C. to 1,200° C.

7. The high-pressure fluid storage container according to claim 1, wherein:

the sealing jacket includes a pair of a tight sealing portions and a connection portion; and the connection portion connects one side of the pair of tight sealing portions to each other to form the insertion space together with the pair of tight sealing portions.

* * * * *